United States Patent [19]
Georgii

[11] 3,967,675
[45] July 6, 1976

[54] METHOD AND DEVICE FOR EXPLOITING THE GEOTHERMAL ENERGY IN A SUBMARINE VOLCANO

[75] Inventor: Hans Christer Georgii, Stockholm, Sweden

[73] Assignee: AB Hydro Betong, Stockholm, Sweden

[22] Filed: Apr. 7, 1975

[21] Appl. No.: 565,611

[30] Foreign Application Priority Data
Apr. 8, 1974 Sweden .............................. 7404701

[52] U.S. Cl. ..................................... 165/1; 165/45; 166/302
[51] Int. Cl.² ........................................ E21B 43/24
[58] Field of Search ................... 165/1, 45; 166/302

[56] References Cited
UNITED STATES PATENTS

| | | | |
|---|---|---|---|
| 3,580,330 | 5/1971 | Maugis | 165/45 |
| 3,612,608 | 10/1971 | Manker | 165/45 |
| 3,640,336 | 2/1972 | Dixon | 165/45 |
| 3,851,495 | 12/1974 | Lahoud | 165/45 |
| 3,863,709 | 2/1975 | Fitch | 165/45 |
| 3,874,174 | 4/1975 | Greene | 165/45 |
| 3,898,849 | 8/1975 | Wyant | 165/45 |

Primary Examiner—Charles J. Myhre
Assistant Examiner—Daniel J. O'Connor
Attorney, Agent, or Firm—Haseltine, Lake & Waters

[57] ABSTRACT

For the exploitation of the geothermal energy in an active submarine volcano an elongated, substantially vertical, columnar concrete body is arranged above the orifice of the volcano so as to extend from the water surface vertically downwards through the water and into the magma in the orifice of the volcano so that the lower portion of the concrete body is submerged in the magma. The concrete body has such a displacement and such a weight that it floats in a balanced vertical position in the water and the magma. A coolant, preferably water, is circulated through internal cooling ducts or pipes in the concrete body from the upper end of the body downwards into the lower portion of the concrete body, which is submerged in the magma and where the coolant is heated by heat transfer from the surrounding magma, whereafter the heated coolant is returned through internal cooling ducts or pipes in the concrete body to the upper end thereof, where the heat content in the heated coolant is utilized.

11 Claims, 8 Drawing Figures

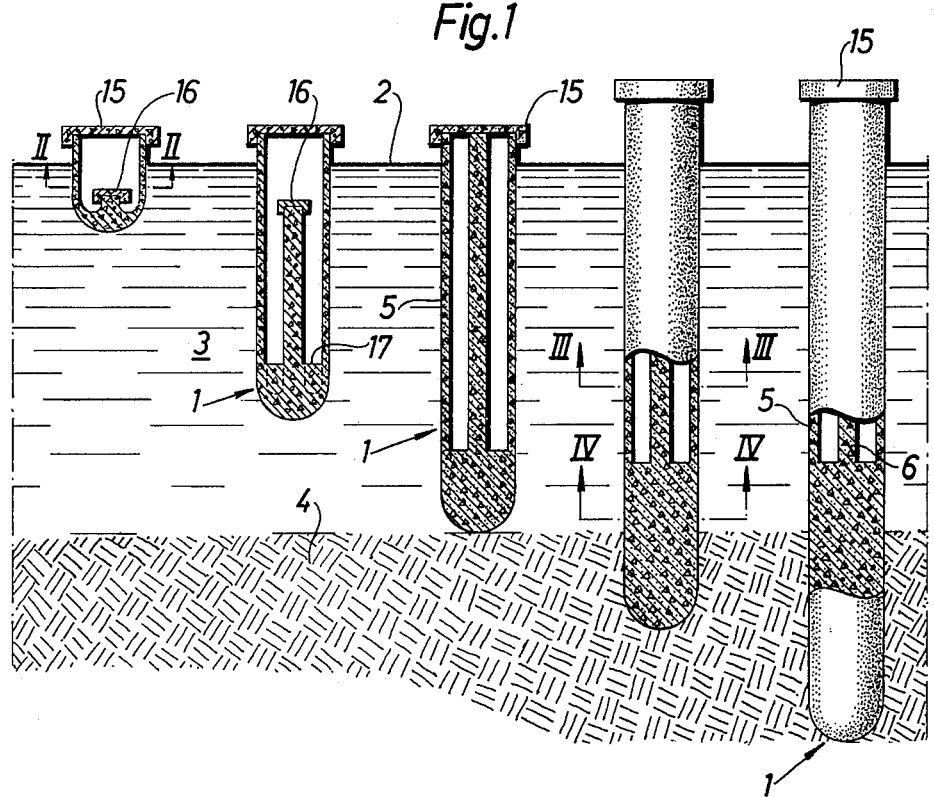
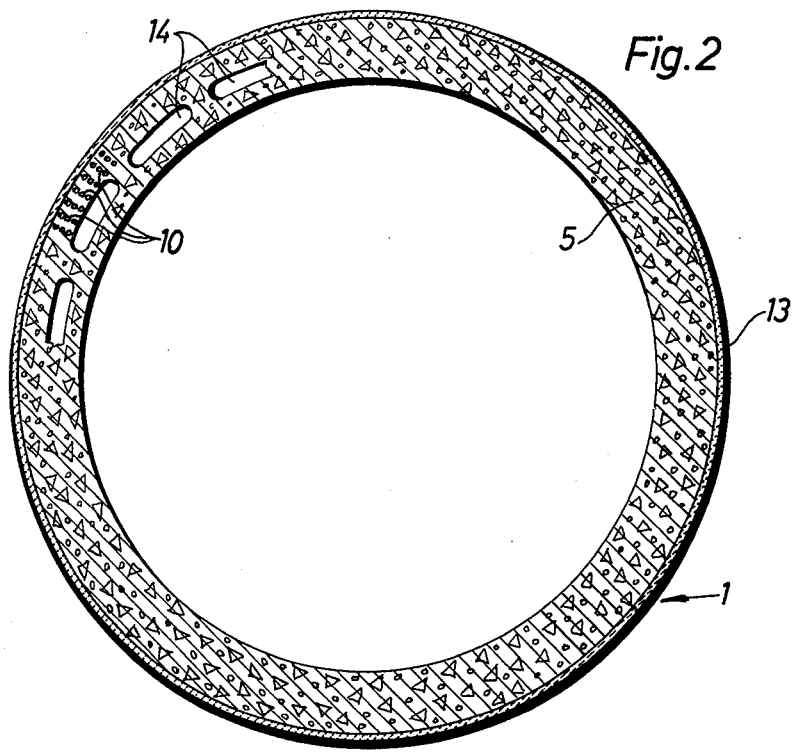

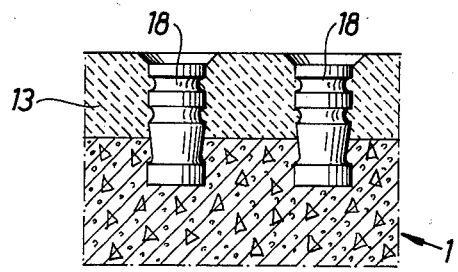
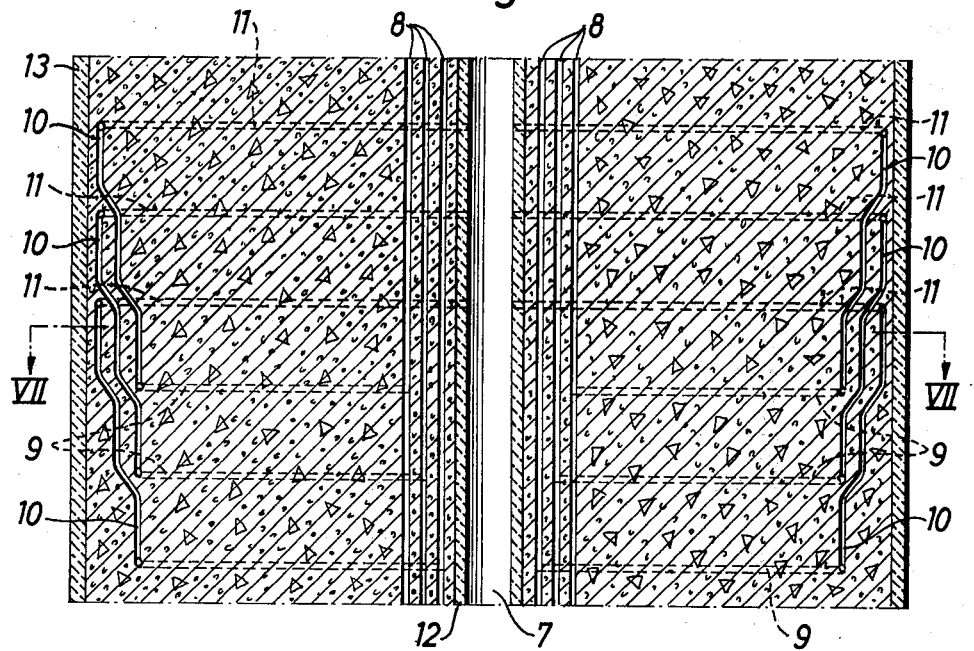
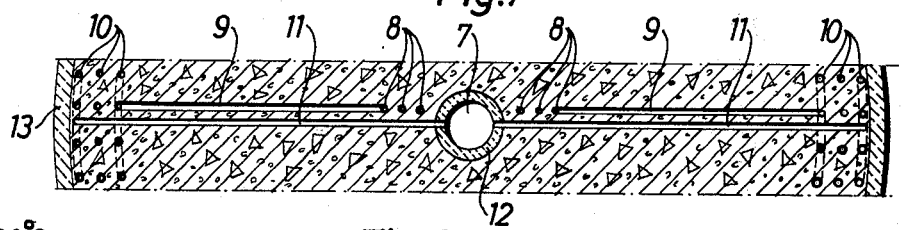
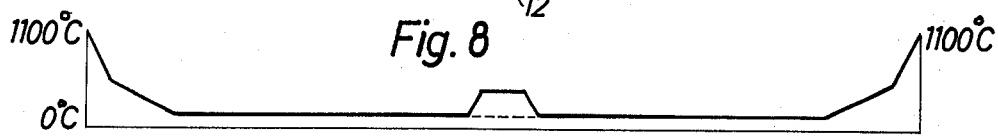

METHOD AND DEVICE FOR EXPLOITING THE GEOTHERMAL ENERGY IN A SUBMARINE VOLCANO

The present invention is related to a method and a device for the exploitation of the geothermal energy in active submarine volcanos.

The ever increasing difficulties and costs involved in the production of the necessary world supply of energy have made it increasingly attractive to try to exploit the practically inexhaustable energy source constituted by the geothermal energy in the interior of the earth. With the exception for hot vulcanic wells the geothermal energy is directly accessible at the surface of the earth only in active volcanos. The technical problems involved in exploiting and utilizing the geothermal energy from an active volcano are evident. However, the majority of the active volcanos on the earth are submarine volcanos located in the sea bottom and as it has now been made possible by means of the technology disclosed for instance in the American patent specifications U.S. Pat. No. 3,249,664 and U.S. Pat. No. 3,686,886 to manufacture extremely large submarine or semi-submarine concrete structures in the open sea, it should be possible to provide a technically and practically usable system for exploiting the geothermal energy in active submarine volcanos.

The object of the invention is therefore to provide, by utilizing modifications and improvements of the technology described in the American patent specifications mentioned above, a method and a device for exploiting the geothermal energy in a submarine volcano.

The method according to the invention is primarily characterized in that an elongated, substantially vertical, columnar concrete body is disposed in the orifice or vent of an active submarine volcano in such a manner that the columnar concrete body has its lower end submerged in the magma in the orifice of the volcano and extends upwards from the surface of the magma through the water to the water surface above, this concrete body having such a displacement and such a weight that it floats in a balanced position in the magma and the water, and that a coolant is circulated through internal cooling ducts in the concrete body from the upper end of the concrete body downwards into the lower portion of the concrete body, which is submerged in the magma and where the coolant is heated by thermal conduction from the surrounding magma, whereafter the heated coolant is returned through internal ducts in the concrete body to the upper end of the concrete body, where the heat content of the heated coolant is utilized.

According to a preferred embodiment of the invention the elongated columnar concrete body is manufactured at the site above the volcano by a method based on the technology described in the U.S. Pat. No. 3,249,664 and preferably by using a production plant of the general type disclosed in the U.S. Pat. No. 3,686,886.

This means that to begin with a short bottom end piece of the columnar concrete body to be manufactured is produced and disposed in a floating position at the water surface above the orifice of the volcano with its axis vertical, whereafter the columnar concrete body is cast on the upper end of said bottom end piece in vertical direction upwards at the same time as the concrete body is lowered in the water and eventually with its lower end into the magma in the orifice of the volcano at the same rate as the casting proceeds at the upper end of the concrete body. Thus, the production or casting of the columnar concrete body takes place mainly at the upper end of the body, which is maintained at a convenient height above the water surface, and as the length of the columnar concrete body increases, the body is lowered vertically in the water while the upper end of the body is maintained at said convenient height above the water surface. The casting is continued in this way, until the body has reached such a length that it extends from the water surface down to the orifice of the volcano on the sea bottom and projects with its lower end a desired distance into the magma in the volcano. The displacement and the weight of the concrete body are adjusted during the manufacturing process and also in the completed state of the body so that the columnar concrete body floats in a balanced position in the magma and the water. The concrete body is provided with internal cooling ducts or pipes, through which a suitable coolant, for instance water, can be pumped from the upper end of the body, which is situated above the water surface, to the lower portion of the body, which is submerged in the magma, where the coolant is heated from the surrounding magma by heat conduction through the wall of the concrete body, whereafter the heated coolant is returned through ducts or pipes in the concrete body up to the upper end, where the heat content in the heated coolant can be utilized in a suitable manner.

When water is used as a coolant, the water is preferably converted to steam in the lower portion of the columnar concrete body, which is submerged in the magma, whereafter the steam is returned through internal ducts in the concrete body to the upper end of the body.

A device according to the invention for exploiting the geothermal energy in a submarine volcano is primarily characterized in that it comprises an elongated, substantially vertical, columnar concrete body which is disposed with its lower end submerged in the magma in the orifice of the volcano and extends from the surface of the magma through the water upwards to the water surface above the volcano, said concrete body having such a displacement and such a weight that it floats in a balanced position in the magma and the water, and that this concrete body is provided with internal cooling loops through which a coolant can be circulated from the upper end of the body to its lower portion, which is submerged in the magma, so as to be heated by heat conduction from the surrounding magma and subsequently returned to the upper end of the concrete body.

In the following the invention and additional characteristic features thereof will be described more in detail with reference to the accompanying drawings, which illustrate by way of example an embodiment of the invention.

In the drawings:

FIG. 1 illustrates schematically different stages of the manufacture of a device according to the invention for exploiting the geothermal energy in an active submarine volcano;

FIG. 2, 3 and 4 show schematically cross-sections of the columnar concrete body along the lines II—II, III—III and IV—IV respectively in FIG. 1;

FIG. 5 shows schematically a partial section through the outer portion of the wall of the concrete body;

FIG. 6 shows schematically an axial section through the lower portion of the concrete body, which is submerged in the magma of the volcano;

FIG. 7 shows schematically a partial cross-section of the concrete body along the line VII—VII in FIG. 6; and FIG. 8 is a diagram illustrating the temperature distribution within the lower portion of the concrete body, which is submerged in the magma.

Figure 3:
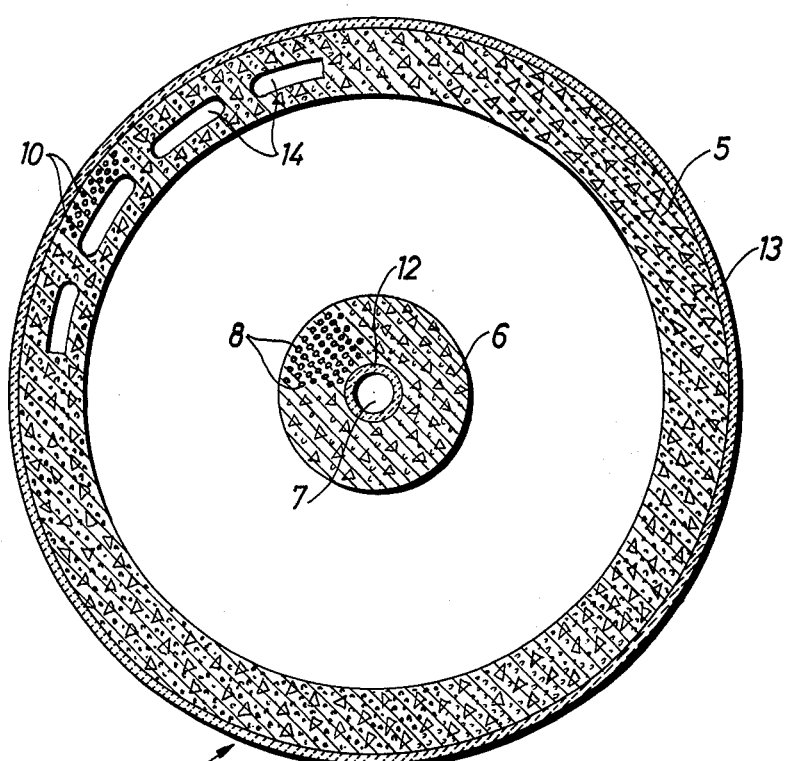

As illustrated schematically in FIGS. 1 to 7 in the drawings the device according to the invention consists of an elongated, substantially vertical, preferably cylindrical, columnar concrete body, generally designated by 1, which extends from the water surface 2 downwards through the water 3 above the orifice of an active submarine volcano and which has its lower portion submerged in the magma 4 in the orifice of the volcano. The upper end of the concrete body 1 is preferably located above the water surface 2. The upper portion of the concrete body 1, which extends through the water 3, is designed as a double concentric tube comprising an outer tube 5 and an inner axial tube 6, which has a substantially smaller diameter and which surrounds a central axial shaft 7 (not illustrated in FIG. 1 for the sake of clearness). The lower portion of the concrete body 1, which is submerged in the magma 4, is designed on the other hand as a substantially homogeneous concrete column, into which the central shaft 7 of the inner tube 6 is prolonged, as most readily seen in FIG. 4.

Figure 4:
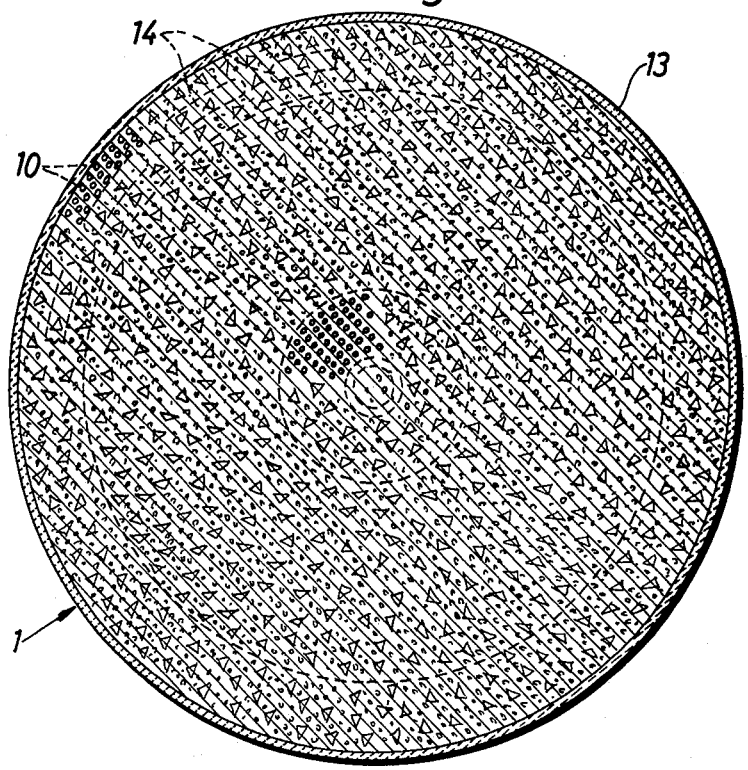

As can be seen in FIGS. 3, 4, 6 and 7, the wall of the inner tube 6 is provided with coolant pipes or ducts 8 which extend from the upper end of the concrete body 1 downwards in the wall of the central pipe 6 and also continue downwards into the lower portion of the concrete body, which is submerged in the magma, as can be seen in FIGS. 4, 6 and 7. In this lower portion of the concrete body these coolant ducts are connected through radial ducts or pipes 9, which can be seen in FIGS. 6 and 7, to a plurality of substantially vertically extending coolant ducts or pipes 10 located close to the external surface of the concrete body. The radial coolant ducts 9 are preferably connected to the lower ends of the coolant ducts 10 at the external surface of the concrete body. The upper ends of these coolant ducts 10 are connected to additional radial ducts 11 which extend inwards to the central shaft 7, which extends through the inner tube 6 upwards to the upper end of the concrete body.

At the upper end of the concrete body a coolant, preferably water, is pumped into the coolant ducts 8, through which the water flows downwards to the lower portion of the concrete body, which is submerged in the magma of the volcano, where the water flows through the radial ducts 9 outwards to the ducts 10 close to the external surface of the concrete body. In the ducts 10 the water is heated and converted into steam by heat conduction from the surrounding magma through the wall of the concrete body and the steam flows through the radial ducts 11 into the central shaft 7, through which the steam flows upwards to the upper end of the concrete body at the water surface 2, where the heat content of the steam can be utilized in any suitable conventional manner.

The inner surface of the central shaft 7 is preferably provided with an heat insulating layer 12.

The external surface of the concrete body is provided with a high-temperature resistant protective layer 13, which consists preferably of a moldable high-temperature resistant material and which is manufactured by casting at the same time as the concrete body as such is cast. This high-temperature resistant protective layer 13 may preferably be mechanically attached to the concrete by means of ceramic anchor members 18, as schematically illustrated in FIG. 5.

In the upper tubular portion of the concrete body 1 the outer tube wall 5 is provided with internal, watertight cavities or compartments 14 which are spaced around the circumference of the concrete body. Some of these cavities or compartments 14 are shown schematically in FIGS. 2 and 3. These cavities 14 can be filled with water to a variable extent and thus used as ballast and trim tanks, by means of which it is possible to control the buoyancy and position of the concrete body in the water and the magma both during the manufacture of the concrete body and during its subsequent use for the exploitation of the thermal energy of the volcano.

The concrete body described above is preferably manufactured in a manner schematically illustrated in FIG. 1. At the beginning of the manufacture of the concrete body 1 a short bottom end piece of the body is disposed in a vertical floating position in the water surface above the orifice of the volcano. Suitable concrete casting forms 15 and 16, for instance sliding forms, are arranged on the upper annular edge of the outer tube wall 5 as well as on the upper annular edge of the central inner tube wall 6 respectively. By pouring concrete into these casting forms 15 and 16 the outer tube 5 and the central tube 6 are cast simultaneously in direction vertically upwards and at the same time the concrete body 1 is lowered in the water 3 at the same rate so that the casting forms 15 and 16 remain at the desired working level. It is appreciated that during this casting of the outer tube 5 and the inner tube 6 the coolant ducts or pipes 8 and 10 are at the same time formed in the wall of the inner tube 6 and in the wall of the outer tube 5 respectively, which will eventually constitute a part of the lower, substantially homogeneous portion of the concrete body 1, as described in the foregoing. Further, the heat insulating layer 12 on the inner surface of the central shaft 7 and the high-temperature resistant protective layer 13 on the outer surface of the concrete body are also produced at the same time, just as the circumferential cavities or compartments 14 in the wall of the outer tube 5. When the concrete body 1 reaches such a length (stage 2 in FIG. 1) that an additional ballasting of the concrete body is necessary in order to lower it in the water at the desired rate, an additional concrete casting 17 is started at the bottom of the annular space between the outer tube 5 and the inner tube 6 so that this space is gradually filled with concrete. At the same time the radial coolant ducts or pipes 9 and 11 are formed in the concrete cast in said annular space. The casting rate at this lower concrete casting station 17 is controlled so that the upper casting stations for the outer tube 5 and the inner tube 6 are maintained at the desired working level above the water surface 2.

When the lower end of the concrete body reaches the surface of the magma 4 in the orifice of the volcano, the casting rate at the lower concrete casting station 17 is increased to substantially the same value as the concrete casting rate at the upper casting stations 15 and 16 for the outer tube 5 and the inner tube 6 respectively so that the level of the lower casting station 17 remains at a constant height above the magma 4. Thereafter the casting is continued at all casting stations at substantially the same rate, at the same time as the concrete body sinks down into the magma, until the concrete body penetrates the magma to the desired depth. The cavities or compartments 14 in the wall of the outer tube 5 are filled with concrete when they, during the casting process, reach the level of the lower casting station 17.

As soon as the concrete body during the manufacturing process reaches the magma in the orifice of the volcano, one starts to circulate a coolant through the cooling ducts in the body in the manner described in the foregoing so that the lower portion of the concrete body, which is submerged in the magma, is cooled and protected against destruction by the high temperature of the magma. The combined effects of this cooling close to the outer surface of the concrete body and of the high-temperature resistant protective layer 13 on the outer surface of the concrete body protect the body against destruction. If during the subsequent use of the concrete body the lower end of the body should gradually meld or break away due to the heat and erosion from the surrounding magma, the casting process at the upper end of the concrete body as well as at the lower concrete station 17 can be restarted and continued at a corresponding rate so that the desired length and the desired vertical position of the concrete body is maintained.

During the manufacture of the concrete body as well as during the subsequent use thereof the upper end of the concrete body, at the water surface, is preferably protected by an annular floating concrete platform of the general type described in the U.S. Pat. No. 3,686,886. This annular concrete platform can be used as a working platform during the manufacture of the concrete body and also thereafter for the equipment necessary for the operation of the concrete body for the exploitation of the thermal energy of the volcano.

As mentioned in the foregoing, the circumferential compartments or cavities 14 in the wall of the outer tube 5 are used as ballast and trim tanks for controlling the buoyancy and the floating position of the concrete body 1 in the water and the magma during the manufacture of the concrete body. Also thereafter these cavities can be used for the same purpose. In case of a renewed eruption of the volcano it may for instance be necessary to raise the concrete body somewhat and this can be achieved by means of said ballast and trim tanks. By alternatingly filling and emptying these ballast and trim tanks it is also possible to produce a "pile driving" effect for driving the concrete body deeper into the magma. By unsymmetric loading of the ballast and trim tanks it is also possible to give the elongated concrete body 1 a somewhat inclined position in the water and the magma, whereby it may be possible to move the concrete body transversally within the orifice of the volcano.

Due to the heat transfer to the circulating coolant within the lower portion of the concrete body it may occur that magma solidifies on the outer surface of the lower portion of the concrete body. This solidified magma may be removed from the concrete body in that part of the steam produced within the lower portion of the concrete is ejected through openings in the wall of the concrete body into the surrounding magma. Such steam jets might also be used for displacing the concrete body 1 transversely and in a desired direction within the orifice of the volcano.

As mentioned in the foregoing, the lower portion of the concrete body 1, which is submerged in the magma, consists substantially of homogeneous concrete. This is necessary in order that this portion of the concrete body shall have the required mechanical strength and the necessary weight. The cooling ducts, the central steam shaft and other cavities and compartments in this lower portion of the concrete body constitute less than one tenth of the total volume of this low portion of the body.

In order that the concrete body shall obtain the necessary weight for penetrating the magma, the concrete body is preferably made of especially heavy concrete, which can be obtained by using ore as ballast material in the concrete.

In order to facilitate the penetration of the elongated columnar concrete body into the magma and improve the floating stability of the concrete body in the magma and the water it may be preferable to give the columnar concrete body a somewhat conical shape so that the diameter of the body is smaller at the lower end of the body than at its upper end.

What is claimed is:

1. A method for exploiting the geothermal energy in a submarine volcano, comprising the steps of arranging an elongated, substantially vertical, columnar concrete body in the orifice of the volcano in such a manner that said concrete body has its lower end submerged in the magma in the orifice of the volcano and extends vertically upwards from the surface of the magma through the water to the water surface above, said concrete body having such a displacement and such a weight that it floats in a balanced position in the magma and the water, and conveying a coolant through internal cooling ducts in said concrete body from the upper end of the body downwards into the lower portion of the concrete body, which is submerged in the magma and where the coolant is heated by heat transfer from the surrounding magma, and returning the heated coolant through internal ducts in the concrete body to the upper end thereof, where the heat content in the heated coolant is utilized.

2. A method as claimed in claim 1, wherein the lower portion of said concrete body, which is submerged in the magma, is designed as a substantially homogeneous concrete column, whereas the portion of the concrete body extending through the water above the magma is designed as a double tube including an outer tube forming the outer wall of the concrete body and an inner tube having a substantially smaller diameter than said outer tube and surrounding a central axial shaft.

3. A method as claimed in claim 2, wherein said central axial shaft in said inner tube is prolonged downwards into the lower portion of the concrete body, which is submerged in the magma, the wall of said inner tube is provided with first internal cooling ducts extending from the upper end of the concrete body downwards to and into the lower portion of the concrete body submerged in the magma, and said lower portion is provided with second cooling ducts extending from said first cooling ducts radially outwards to points close to the outer surface of the concrete body and then radially inwards to said central axial shaft, said coolant being circulated from the upper end of the concrete body through said first cooling ducts in the wall of said inner tube, through said second cooling ducts and then through said central axial shaft back to the upper end of the concrete body.

4. A method as claimed in claim 1, wherein said coolant is water which is converted to steam in the lower portion of the concrete body submerged in the magma and said steam is returned to the upper end of the concrete body.

5. A method as claimed in claim 1, wherein the outer surface of said concrete body is provided with a protective layer of high-temperature resistant material.

6. A method as claimed in claim 3, wherein the inner surface of said central axial shaft is provided with a heat insulating layer.

7. A method as claimed in claim 1, wherein the wall of said outer tube is provided with internal closed cavities which can be filled with water to a variable extent so as to serve as ballast and trim tanks for the concrete body.

8. A method as claimed in claim 1, wherein said elongated columnar concrete body has a cross-section tapering towards the lower end of the body.

9. A method as claimed in claim 1, wherein said elongated columnar concrete body is manufactured in that to begin with a short bottom end piece of the body is disposed in a floating position with its axis vertical in the water surface above the orifice of the volcano, whereafter the concrete body is cast in vertical direction upwards from the upper end of said end piece at the same time as the concrete body is lowered in the water and eventually with its lower end into the magma in the orifice of the volcano at a rate corresponding to the vertical rate of casting at the upper end of the concrete body.

10. A method as claimed in claim 9, wherein the upper end of the concrete body at the water surface is protected, at least during the casting of the concrete body, by a surrounding annular concrete platform floating in the water.

11. A method as claimed in claim 10, wherein said annular floating concrete platform is used as a working platform during the casting of the concrete body.

* * * * *